(No Model.)

N. E. BRADFORD.
NUT LOCK FOR VEHICLE AXLES.

No. 500,095. Patented June 20, 1893.

Witnesses:

Inventor.
N. E. Bradford
Per O. D. Lewis
Att'y.

UNITED STATES PATENT OFFICE.

NELSON E. BRADFORD, OF ALLEGHENY, PENNSYLVANIA.

NUT-LOCK FOR VEHICLE-AXLES.

SPECIFICATION forming part of Letters Patent No. 500,095, dated June 20, 1893.

Application filed September 29, 1892. Serial No. 447,316. (No model.)

*To all whom it may concern:*

Be it known that I, NELSON E. BRADFORD, a citizen of the United States, residing at Allegheny, in the county of Allegheny and State of Pennsylvania, have invented certain new and useful Improvements in Devices for Locking the Nuts of Vehicle-Axles; and I do hereby declare the following to be a full, clear, and exact description of the invention, such as will enable others skilled in the art to which it pertains to make and use the same, reference being had to the accompanying drawings, which form a part of this specification.

My invention relates to an improved nut lock for vehicle spindles, and consists in certain details of construction, and combination of parts as will be fully described hereinafter.

Figure 1:
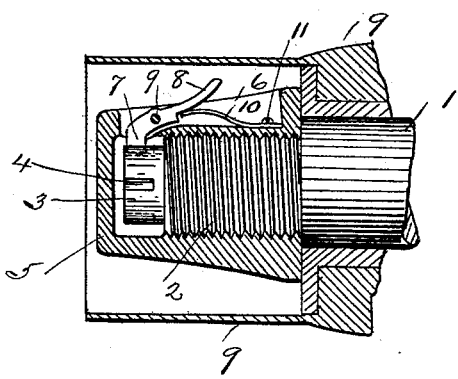
Figure 2:
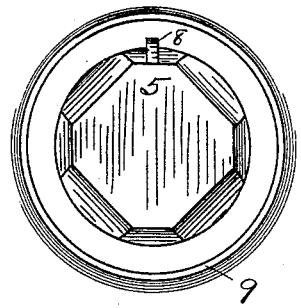
Figure 3:
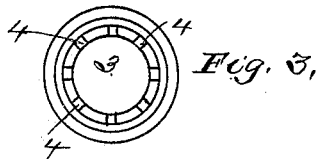

In the accompanying drawings, Figure 1— is a side sectional elevation of a portion of a vehicle hub and axle, having my improved nut locking device attached thereto. Fig. 2 is an end elevation of the same. Fig. 3 is an end elevation of the axle, showing the grooves formed radially about the extremity of the same.

To put my invention into practice with a vehicle axle of ordinary construction, consisting of the spindle 1, having a threaded end 2, for the reception of a nut for the purpose of holding the wheel in position, I form on the extreme end of the axle a cylindrical extension 3, devoid of screw threads having a series of radially arranged grooves, spaced at regular intervals about the same. Operating on this threaded portion 2 is a nut 5, having a closed front end, and an opening or slot 6, formed in the direction of the length of the same. Operating within this slot 6, is a pawl 7 pivoted by means of a pin 9, and backed by a flat retracting spring 10, and the said pawl adapted to engage with one of the grooves 4, formed in the front portion 3, of the axle. This pawl 7 is provided with an upward detent 8, which projects above the surface of the nut, in a manner that when a socket wrench is placed over the nut 5, the said extension will be depressed into the slot 6, and thereby elevate the pawl out of the groove 4, and the nut removed in the ordinary manner.

The pawl 7 when engaged with one of the grooves 4 will lock the nut 5 to prevent turning, and the said nut may be easily removed in the manner before described.

Having thus described my invention, what I claim, and desire to secure by Letters Patent, is—

In a device of the class described, the combination with a screw-threaded spindle having an integral extension devoid of screw-threads and provided with a series of peripheral and radial recesses extending axially of the spindle, of a spindle-nut interiorly screw-threaded to engage the screw-threads of the spindle and provided on its side with a surface-recess merging into a slot at its forward end, a catch-pawl pivoted in said recess lengthwise of the spindle upon a fulcrum-pin or bolt and having its front end in the form of an engaging tooth for the peripheral recesses and its rear extremity constituting an upwardly inclined detent projecting above the exterior plane of the nut, and a flat retracting spring bolted at its rear end in the bottom of the surface-recess and its free end exerting tension against the under side of the rear portion of the catch-pawl, substantially as specified.

In testimony that I claim the foregoing I hereunto affix my signature this 13th day of August, A. D. 1892.

NELSON E. BRADFORD. [L. S.]

In presence of—
 M. E. HARRISON,
 JOHN S. KENNEDY.